United States Patent
Wang

(10) Patent No.: US 7,145,315 B2
(45) Date of Patent: Dec. 5, 2006

(54) OVER-CURRENT DETECTION CIRCUIT IN A SWITCH REGULATOR

(75) Inventor: Hong Wei Wang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 220 days.

(21) Appl. No.: 10/966,225

(22) Filed: Oct. 15, 2004

(65) Prior Publication Data

US 2006/0061341 A1    Mar. 23, 2006

Related U.S. Application Data

(60) Provisional application No. 60/611,589, filed on Sep. 21, 2004.

(51) Int. Cl.
*G05F 1/40* (2006.01)
*H02H 7/00* (2006.01)
*H02H 7/10* (2006.01)

(52) U.S. Cl. .................................... 323/282; 361/18
(58) Field of Classification Search ........ 323/222–226, 323/268, 271, 273, 275, 276, 282, 285, 290; 361/18, 79, 86, 87, 93.1, 93.9
See application file for complete search history.

(56) References Cited

U.S. PATENT DOCUMENTS

| | | | | |
|---|---|---|---|---|
| 5,359,552 A * | 10/1994 | Dhong et al. | .......... | 365/189.09 |
| 6,307,360 B1 * | 10/2001 | Kajiwara et al. | .......... | 323/282 |
| 6,624,994 B1 * | 9/2003 | Schmoock et al. | .......... | 361/93.1 |
| 6,677,737 B1 * | 1/2004 | Hamon et al. | .......... | 323/280 |
| 6,867,573 B1 * | 3/2005 | Carper | .......... | 323/277 |
| 6,998,826 B1 * | 2/2006 | Fukui | .......... | 323/282 |
| 7,023,276 B1 * | 4/2006 | Vollrath et al. | .......... | 330/261 |
| 7,071,664 B1 * | 7/2006 | Teggatz et al. | .......... | 323/280 |

* cited by examiner

*Primary Examiner*—Matthew V. Nguyen

(57) ABSTRACT

A switch regulator includes an inductor, a reference transistor, a first switching transistor, and a second switching transistor. The first switching transistor includes a gate electrode, a first main electrode (e.g., a source or a drain), and a second main electrode (e.g., a source or a drain). The first switching transistor is coupled in series with the inductor when it is turned on by a clock. The first main electrode (e.g., the source or the drain) of the switching transistor is connected to a ground or a fixed voltage power supply. A reference voltage may then be generated by flowing a current through the reference transistor. As such, the switch regulator contains an over-current detector that is flexible in size of current to be detected while consuming a relatively small amount of space and having substantially low cost on the overall efficiency of the switch regulator.

24 Claims, 6 Drawing Sheets

OVER-CURRENT DETECTION CIRCUIT IN A SWITCH REGULATOR

CROSS-REFERENCES TO RELATED APPLICATIONS

This application claims priority pursuant to 35 U.S.C. §119(e) to U.S. Provisional Application No. 60/611,589, filed Sep. 21, 2004, for AN OVER-CURRENT DETECTION CIRCUIT IN A SWITCH REGULATOR, the entire content of which is incorporated herein by reference.

FIELD OF THE INVENTION

The present invention relates to voltage converters and, in particular, to switch regulators having over-current detection circuits.

BACKGROUND OF THE INVENTION

An electronic device, such as a computer peripheral, may be powered from a single fixed voltage power supply and use a switch regulator to supply another voltage for driving a load circuit. A step-down or buck mode switch regulator converts an applied input voltage to a lower output voltage. A step-up or boost mode switch regulator converts an applied input voltage to a higher output voltage.

Typically, a switch regulator includes an inductor to smooth out a current passing through it. To ensure that the switch regulator is functioning properly, the current going through the inductor should be monitored and protected against some limitations. One solution for detecting the inductor current is to provide a sense resistor connected in series with the inductor and to measure the voltage drop over this resistor. Specifically, FIG. 1 illustrates a simplified schematic of a switch regulator having a sense resistor coupled in series with an inductor.

As is shown in FIG. 1, sense resistor (R) 100 is coupled in series with inductor 110 via input node 120a. Input node 120a is coupled with a positive input of comparator 130. Comparator 130 also includes a negative input that is coupled with the sense resistor 100 via output node 120b. Comparator 130 then measures the voltage drop over sense resistor 100 in an effort to measure the current going through inductor 110.

FIG. 2 illustrates another embodiment for measuring the current going through an inductor using a sense resistor. In the embodiment of FIG. 2, sense resistor 200 is coupled in series with NMOS switching transistor 240 via input node 220a. Input node 220a is coupled with a positive input of comparator 230. Comparator 230 also includes a negative input that is coupled with the sense resistor 200 via output node 220b. Comparator 230 then measures the voltage drop over sense resistor 200 in an effort to measure the current going through inductor 210. It should be appreciated by those skilled in the art that in this embodiment, the current going through inductor 210 is determined at a time when clock 250 turns on NMOS switching transistor 240 and turns off PMOS switching transistor 260.

Regardless of whether a sense resistor of a switch regulator is coupled directly with an inductor (that it is sensing) or indirectly via a transistor (or a switch), the sense resistor will reduce an efficiency of the switch regulator because the sense resistor is coupled in series with the inductor (which results in loss of power). Also, the reference setup for a comparator coupled with the sense resistor is quite complicated and troublesome to design. Moreover, since the sense resistor is typically formed using a metal piece, it can be an expensive device that has a large system footprint. Accordingly, there is a need to provide an over-current detector in a switch regulator that overcomes the above-described shortcomings of the sense resistor while retaining its advantages.

SUMMARY OF THE INVENTION

The invention relates to methods and associated systems of providing an over-current detector and/or for detecting an over-current in a switch regulator.

It is an aspect of the invention to provide an over-current detector that is flexible in size of current to be detected while consuming a relatively small amount of space on a switch regulator.

It is another aspect of the invention to provide an over-current detector having substantially low cost on the overall efficiency of its switch regulator.

An exemplary embodiment according to the present invention includes a switch regulator having an inductor, a reference transistor, a first switching transistor, and a second switching transistor. The first switching transistor includes a gate electrode, a first main electrode (e.g., a source or a drain), and a second main electrode (e.g., a source or a drain). The first switching transistor is coupled in series with the inductor when it is turned on by a clock. The first main electrode (e.g., the source or the drain) of the switching transistor is connected to a ground or a fixed voltage power supply.

In particular, the reference transistor may be formed using the same type of transistor as the first switching transistor (e.g., if the first switching transistor is an NMOS transistor then the reference transistor is also an NMOS transistor). A reference voltage may be generated by flowing a current through the reference transistor. As such, the embodiment of the present invention provides an over-current detector that is flexible in size of current to be detected while consuming a relatively small amount of space and having substantially low cost on the overall efficiency of the switch regulator. In addition, a reference current and a size of the reference transistor may be rated or selected relative to the first switch and the protection current. In this way, the over-current detector of the exemplary embodiment is quite robust over various processes, power supplies, and temperature variations.

In another exemplary embodiment of the present invention, a switch regulator includes a voltage node, an electrical device, a clock, a first switching transistor, a second switching transistor, and a reference transistor. The voltage node has a fixed voltage level. The electrical device has a current level limitation. The clock provides a control signal. The first switching transistor has a first gate, a first main electrode, and a second main electrode. The first gate is coupled to receive the control signal from the clock, and the first main electrode is coupled to the voltage node. The second switching transistor has a second gate coupled to receive the control signal from the clock. The reference transistor has a third gate coupled to receive the control signal from the clock. The control signal turns on the first switching transistor and the reference transistor and turns off the second switching transistor. The first switching transistor is electrically coupled in series to the electrical device via the second main electrode when the first switching transistor is turned on, and the reference transistor determines a current going through the electrical device when the first switching transistor and the reference transistor are turned on.

In still another embodiment of the present invention, a switch regulator includes a ground node having a ground voltage level, an inductor having a current level limitation, and a clock for providing a control signal. The switch regulator further includes a first NMOS transistor, a PMOS transistor, a second NMOS transistor, and a reference current source. The first NMOS transistor may be a predetermined number of times larger than the second NMOS transistor. The first NMOS transistor has a first gate and a main electrode. The first gate is coupled to receive the control signal from the clock, and the main electrode is coupled to the ground node. The PMOS transistor has a second gate coupled to receive the control signal from the clock. The second NMOS transistor has a third gate coupled to receive the control signal from the clock. The reference current source is for providing a reference current. As such, when the control signal turns on the first and second NMOS transistors, the first NMOS transistor is electrically coupled in series between the inductor and the ground node, and the second NMOS transistor is electrically coupled to receive the reference current from the reference current source.

In yet another embodiment of the present invention, a switch regulator includes a fixed voltage power supply for providing a fixed voltage level, an inductor having a current level limitation, and a clock for providing a control signal. The switch regulator also includes a first PMOS transistor, an NMOS transistor, a second PMOS transistor, a reference current source, and a comparator. The first PMOS transistor includes a first gate, a first main electrode, and a second main electrode. The first gate is coupled to receive the control signal from the clock, and the first main electrode is coupled to receive the fixed voltage level from the fixed voltage power supply. The NMOS transistor has a second gate coupled to receive the control signal from the clock. The second PMOS transistor has a third gate coupled to receive the control signal from the clock. The reference current source provides a reference current. The comparator has a positive input and a negative input. The negative input is coupled between the second electrode of the first PMOS transistor and the inductor, and the positive input is coupled between the reference transistor and the reference current source. As such, when the control signal provided from the clock turns on the first and second PMOS transistors, the first PMOS transistor is electrically coupled in series to the inductor via the second main electrode, and the second PMOS transistor is electrically coupled in series to the reference current source.

A more complete understanding of an over-current detection circuit in a switch regulator of the present invention will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

These and other features, aspects and advantages of the present invention will be more fully understood when considered with respect to the following detailed description and accompanying drawings, wherein.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention is directed to systems and methods that provide an over-current detector and/or that detect an over-current in a switch regulator.

In one embodiment of the present invention, a switch regulator includes an inductor and an over-current detector for detecting a current going through the inductor. The detector is flexible in size of current to be detected while consuming a relatively small amount of space and having substantially low cost on the overall efficiency of the switch regulator.

Figure 1:
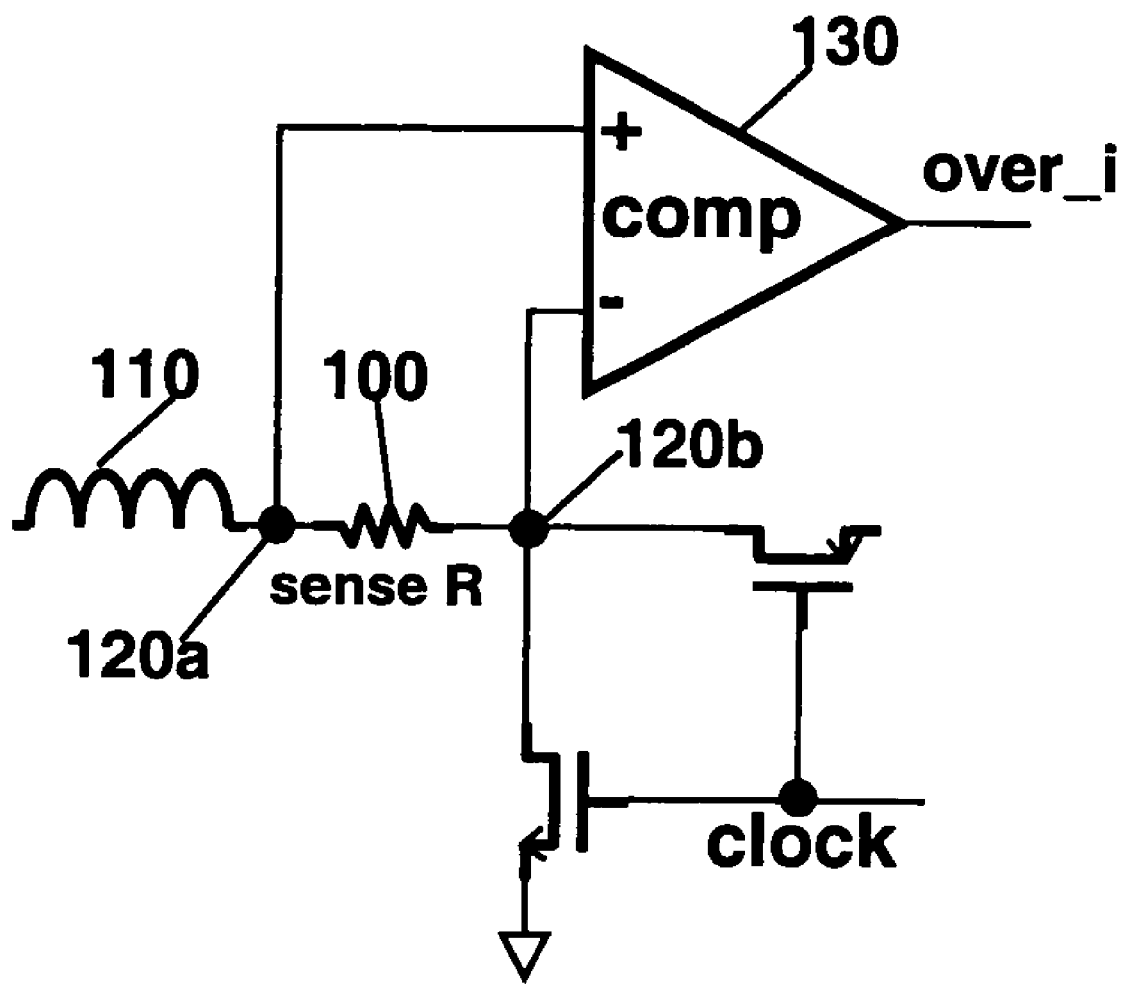
FIG. 1 is a schematic diagram of prior art including a sense resistor connected in series with an inductor.
Figure 2:
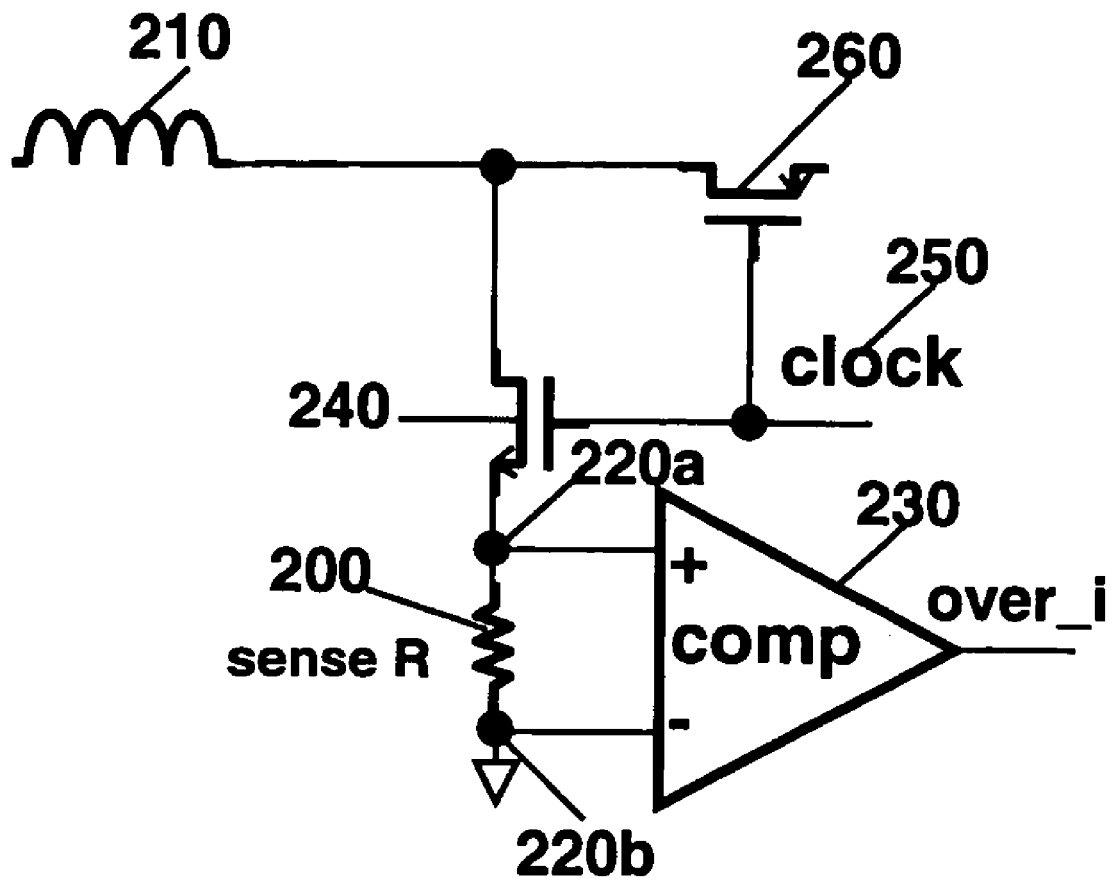
FIG. 2 is a schematic diagram of prior art including a sense resistor connected in series with a switch.
Figure 3:
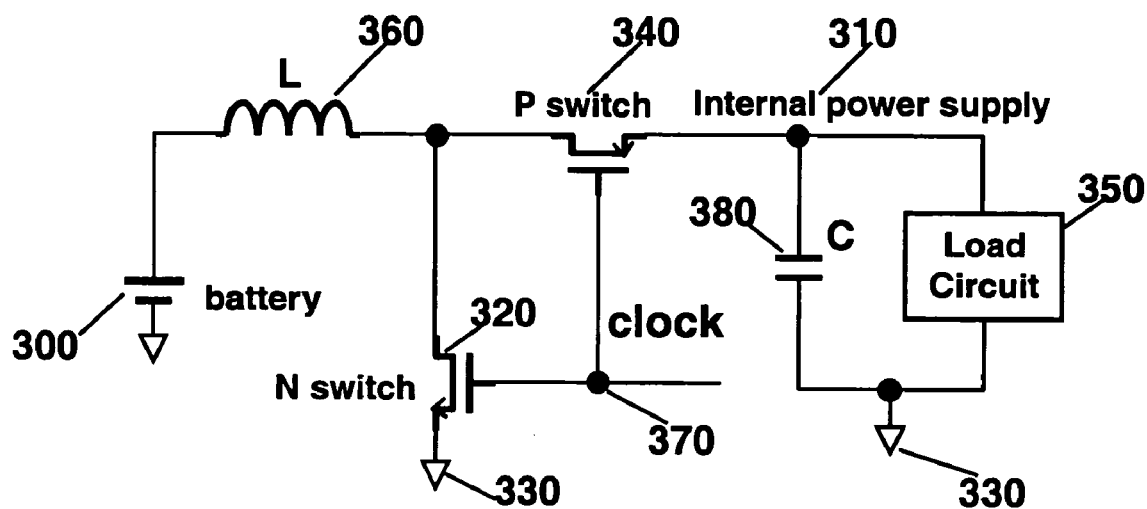
FIG. 3 is a schematic diagram including a boost mode switch regulator to which the exemplary embodiments of the present invention can be applied.

Referring now to FIG. 3, fixed voltage power supply (or battery) 300 is coupled with NMOS switching transistor 320 and ground 330 via inductor 360. Fixed voltage power supply 300 is also coupled with PMOS switching transistor 340 and internal power supply 310 via inductor 360. The gate of NMOS switching transistor 320 and the gate of PMOS switching transistor 340 are both coupled to clock 370. In addition, internal power supply 310 is coupled in parallel with capacitor 380 and load circuit 350 that are both coupled to ground 330.

In operation, at proper clock duty cycle of clock 370 (i.e., NMOS switching transistor 340 on time over clock period), internal power supply 310 will be maintained at a specific voltage (e.g., $V_{internal}$) that is higher than a first voltage (e.g., $V_{bat}$) supplied by fixed voltage power supply (or battery) 300. Thus, the embodiment in FIG. 3 is directed to a load circuit that is driven by a boost mode switch regulator (i.e., $V_{bat} < V_{internal}$).

Specifically, when NMOS switching transistor 320 is turned on and PMOS switching transistor 340 is turned off, the current through inductor 360 and NMOS switching transistor 320 increases, and the charges on capacitor 380 are supplied to load circuit 350 for driving the load circuit 350. When NMOS switching transistor 320 is turned off and PMOS switching transistor 340 is turned on, the current through inductor 360 and PMOS switching transistor 340 decreases (because $V_{bat} < V_{internal}$), but the current will now charge capacitor 380 and also be supplied to load circuit 350.

Figure 4:
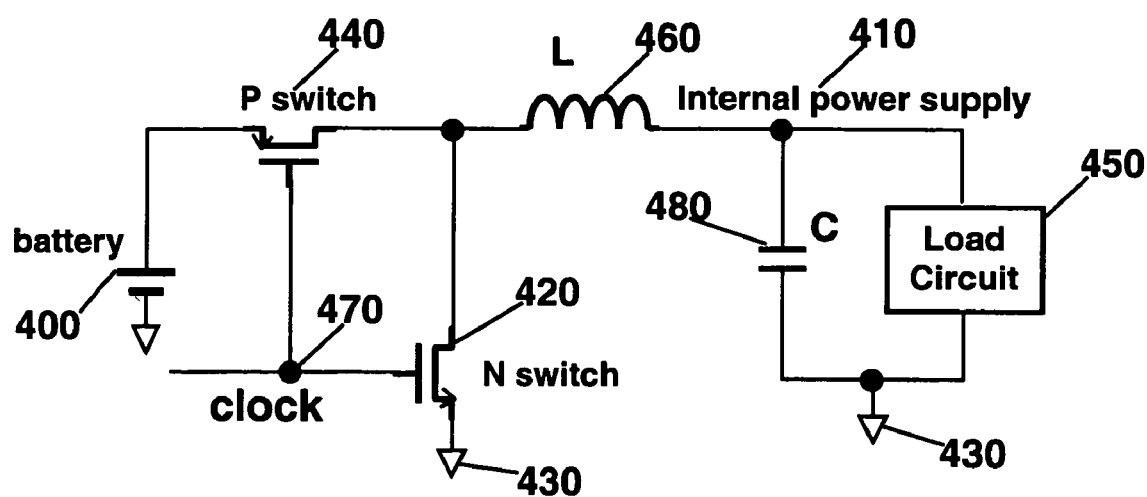
FIG. 4 is a schematic diagram including a buck mode switch regulator to which the exemplary embodiments of the present invention can be applied.

In another embodiment and referring now to FIG. 4, fixed voltage power supply (or battery) 400 is coupled with inductor 460 and internal power supply 410 via PMOS switching transistor 440. Fixed voltage power supply 400 is also coupled with NMOS switching transistor 420 and ground 430 via PMOS switching transistor 440. The gate of NMOS switching transistor 420 and the gate of PMOS switching transistor 440 are both coupled to clock 470. In addition, internal power supply 410 is coupled in parallel with capacitor 480 and load circuit 450 that are both coupled to ground 430.

In operation, at proper clock duty cycle of clock 470 (i.e., PMOS switching transistor 440 on time over clock period), internal power supply 410 will be maintained at a specific voltage (e.g., $V_{internal}$) that is lower than a first voltage (e.g., $V_{bat}$) supplied by fixed voltage power supply (or battery) 400. Thus, the embodiment in FIG. 4 is directed to a load circuit that is driven by a buck mode switch regulator (i.e., $V_{bat} > V_{internal}$).

Specifically, when PMOS switching transistor 440 is turned on and NMOS switching transistor 420 is turned off, the current through inductor 460 and PMOS switching transistor 420 increases, and the current charges capacitor 480 and is supplied to load circuit 450 for driving the load circuit 450. When PMOS switching transistor 440 is turned off and NMOS switching transistor 420 is turned on, the current through NMOS switching transistor 420 and inductor 460 decreases, but the charges on capacitor 480 will now continue to supply the load circuit 450.

Exemplary embodiment of the present inventions can be applied to the switch regulators of FIGS. 3 and 4, as well as other suitable switch regulators. In addition, the switch regulators of FIGS. 3 and 4 are provided for exemplary purposes only and the invention is not, thereby, limited.

Figure 5:
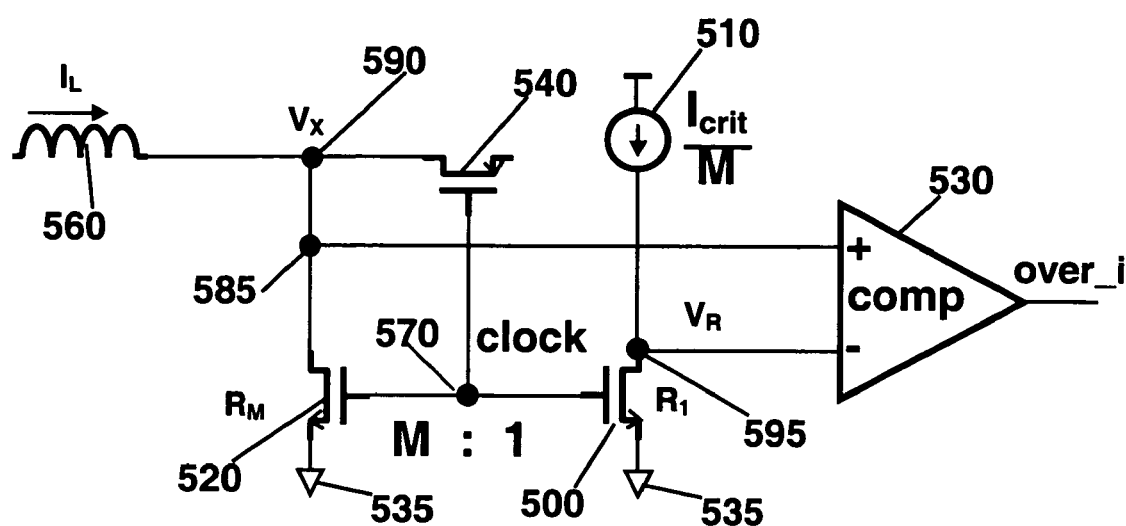
FIG. 5 is a schematic diagram including an over-current detection circuit in accordance with an exemplary embodiment of the present invention applied in boost mode switching regulator.

Referring now to FIG. 5, an over-current detection circuit in one embodiment of the present invention includes NMOS reference transistor 500, reference current supply 510, and comparator 530 that are all coupled to one another. Specifically, inductor (or electrical device) 560 is coupled to first voltage node 590 ($V_x$). First voltage node 590 is coupled to a first main electrode (e.g., a drain) of NMOS switching transistor 520. A second main electrode (e.g., a source) of NMOS switching transistor 520 is coupled to ground 535. First voltage node 590 is also coupled to a first main electrode (e.g., a drain) of PMOS switching transistor 540. A second main electrode (e.g., a source) of PMOS switching transistor 540 is coupled to internal power supply (not shown) that can have a voltage (e.g., $V_{internal}$) higher than the voltage ($V_x$) on first voltage node 590. The gate of NMOS switching transistor 520 and the gate of PMOS switching transistor 540 are both coupled to clock 570.

In addition, clock 570 is coupled to the gate of NMOS reference transistor 500. A second main electrode (e.g., a source) of NMOS reference transistor 500 is coupled to ground 535. A first main electrode (e.g., a drain) of NMOS reference transistor 500 is coupled to second voltage node 595 ($V_R$). Second voltage node 595 is coupled to reference current source 510 that produces a reference current equal to a critical current ($I_{crit}$) divided by a predetermined number (M). Second voltage node 595 is also coupled to a negative input of comparator 530. A positive input of comparator 530 is coupled to connecting node 585 that is coupled to first voltage node 590. Connecting node 585 has the same voltage ($V_x$) as first voltage node 590.

Moreover, in the embodiment of FIG. 5, NMOS reference transistor 500 is shown to have a size that is a predetermined number of times or M times smaller than NMOS switching transistor 520. Thus, NMOS reference transistor 500 has an effective resistance ($R_1$) that is M times larger than an effective resistance ($R_M$) of NMOS switching transistor 520 (i.e., $R_1 = M*R_M$ or $R_M = R_1/M$).

In operation, when clock=1, due to the size ratio of NMOS reference transistor 500 and NMOS switching transistor 520 (i.e., $R_1 = M*R_M$), the voltage ($V_R$) at second voltage node 595 coupled to the first main electrode (e.g., the drain) of NMOS reference transistor 500 is the critical current ($I_{crit}$) times the effective resistance ($R_M$) of NMOS switching transistor 520 (i.e., $V_R = I_{crit}/M*R1 = I_{crit}*R_M$). In addition, when the inductor current ($I_L$) is greater than the critical current ($I_{crit}$), then the voltage ($V_x$) at first voltage node 590 is greater than the critical current ($I_{crit}$) times the effective resistance ($R_M$) of switching transistor 520 (i.e., $V_x > V_R$) Thus, the output (over_i) of comparator 530 will be high, indicating an over current in inductor 560.

Specifically, in FIG. 5, when clock 570 is high (e.g., clock=1), NMOS switching transistor 520 and NMOS reference transistor 500 are turned on (and PMOS switching transistor 540 is turned off), and the current ($I_L$) of inductor 560 will flow through NMOS switching transistor 520 and the current ($I_{crit}/M$) of reference current source 510 will flow through NMOS reference transistor 500, so that the output (over_i) of comparator 530 has real meaning. That is, the output (over_i) directly monitors the current ($I_L$) of inductor 560 and determines if the inductor current ($I_L$) is an over current without complicated reference setup. Moreover, since it uses NMOS reference transistor 500 for monitoring and protecting inductor 560 and eliminates the need of a sense resistor, the embodiment of FIG. 5 provides an over-current detection circuit that is flexible in size of current to be detected while consuming a relatively small amount of space and having substantially low cost on the overall efficiency of the switch regulator.

In addition, when clock 570 is low (e.g., clock=0), NMOS switching transistor 520 is turned off and PMOS switching transistor 540 is turned on. Since the current of the inductor 560 (when clock 570 is low, e.g., clock=0)) will now flow through PMOS switching transistor 540 and decrease because of the voltage of internal power supply (i.e., $V_{internal} > V_{bat}$ in the boost mode switch regulator), the current ($I_L$) of inductor 560 normally does not need to be monitored at this clock cycle (e.g., clock=0).

Figure 6:
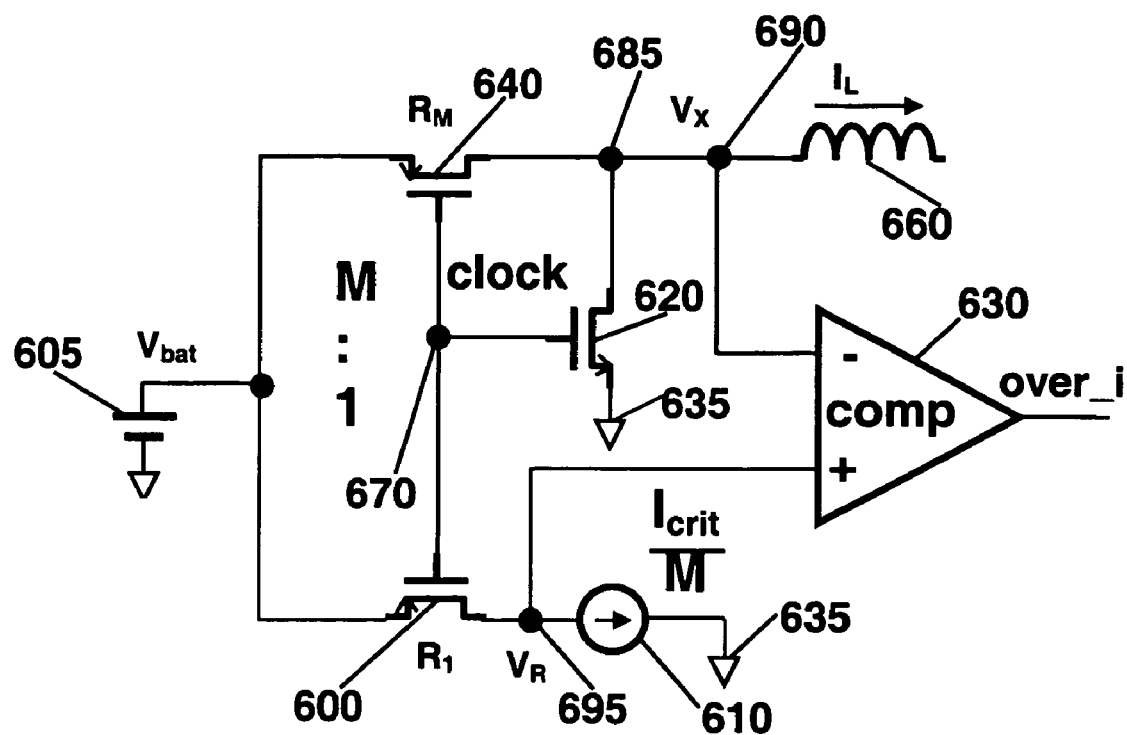
FIG. 6 is a schematic diagram including an over-current detection circuit in accordance with another exemplary embodiment of the present invention applied in buck mode switching regulator.

Referring now to FIG. 6, an over-current detection circuit in another embodiment of the present invention includes PMOS reference transistor 600, reference current supply 610, and comparator 630 that are all coupled to one another. Specifically, fixed voltage power supply (or battery) 605 is coupled to a first main electrode (e.g., a source) of PMOS switching transistor 640. A second main electrode (e.g., a drain) of PMOS switching transistor 640 is coupled to first voltage node 690, which is coupled to both inductor (or electrical device) 660 and a negative input of comparator 630. Inductor 660 is coupled to internal power supply (not shown) that can have a voltage (e.g., $V_{internal}$) lower than the voltage ($V_x$) on first voltage node 690 and/or the voltage ($V_{bat}$) on fixed voltage power supply (or battery) 605. The second main electrode of PMOS switching transistor 640 is also coupled to a first main electrode (e.g., a drain) of NMOS switching transistor 620 via connecting node 685. A second main electrode (e.g., a source) of NMOS switching transistor 620 is coupled to ground 635. The gate of NMOS switching transistor 620 and the gate of PMOS switching transistor 640 are both coupled to clock 670.

In addition, clock 670 is coupled to the gate of PMOS reference transistor 600. A first main electrode (e.g., a source) of PMOS reference transistor 600 is coupled (in parallel with the first main electrode of PMOS switching transistor 640) to fixed voltage power supply (or battery) 605. A second main electrode (e.g., a drain) of PMOS reference transistor 600 is coupled to second voltage node 695 ($V_R$). Second voltage node 695 is coupled to reference current source 610 that produces a reference current that is equal to a critical current ($I_{crit}$) divided by a predetermined number (M). Second voltage node 695 is also coupled to a positive input of comparator 630. As discussed above, the negative input of comparator 630 is coupled to first voltage node 690 having the voltage ($V_x$).

Moreover, in the embodiment of FIG. 6, PMOS reference transistor 600 is shown to have a size that is a predetermined number of times or M times smaller than PMOS switching transistor 640. Thus, PMOS reference transistor 600 has an effective resistance ($R_1$) that is M times larger than an effective resistance ($R_M$) of PMOS switching transistor 640.

In operation, when clock=0, due to the size ratio of PMOS reference transistor 600 and PMOS switching transistor 640 (i.e., $R_1=M*R_M$), the voltage ($V_R$) at second voltage node 695 coupled to the second main electrode (e.g., the drain) of PMOS reference transistor 600 is the critical current ($I_{crit}$) times the effective resistance ($R_M$) of PMOS switching transistor 640 (i.e., $V_R=V_{bat}-I_{crit}/M*R1=I_{crit}*R_M$). In addition, when the inductor current ($I_L$) is greater than the critical current ($I_{crit}$), then the voltage ($V_{bat}$) at the fixed voltage supply 605 minus the voltage ($V_X$) at first voltage node 690 is greater than the critical current ($I_{crit}$) times the effective resistance ($R_M$) of switching transistor 620 ($I_L>I_{crit}$, then $V_{bat}-V_X>I_{crit}*R_M$, i.e., $V_X<V_R$). Thus, the output (over_i) of comparator 630 will be high, indicating over current in inductor 660.

Specifically, in FIG. 6, when clock 670 is low (i.e., clock=0), PMOS switching transistor 640 and PMOS reference transistor 600 are turned on (and NMOS switching transistor 620 is turned off), and the current ($I_L$) of inductor 660 will flow through PMOS switching transistor 640 and the smaller reference current ($I_{crit}/M$) will flow through PMOS reference transistor 600 (because $V_{bat}>V_X$; $V_{bat}>V_R$; and $V_X<V_R$), so that the output (over_i) of comparator 630 has real meaning. That is, the output (over_i) directly monitors the current ($I_L$) of inductor 660 and determines if the inductor current ($I_L$) is an over current without complicated reference setup. Moreover, since it uses PMOS reference transistor 600 for monitoring and protecting inductor 660 and eliminates the need of a sense resistor, the embodiment of FIG. 6 provides an over-current detection circuit that is flexible in size of current to be detected while consuming a relatively small amount of space and having substantially low cost on the overall efficiency of the switch regulator.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, MOSFET devices have been illustrated, but it should be apparent that the inventive concepts described above would be equally applicable to other types of transistor devices and/or switches. For another example, the invented circuits can not only detect the over current in inductors, but also be merely used in detecting the over current flowing in MOSFET itself or in other devices. In view of the above it will be understood that the invention is not limited to the particular embodiments or arrangements disclosed, but is rather intended to cover any changes, adaptations or modifications which are within the scope and spirit of the appended claims, and equivalents thereof.

What is claimed is:

1. A switch regulator comprising:
   a voltage node having a fixed voltage level;
   an electrical device having a current level limitation;
   a clock for providing a control signal;
   a first switching transistor having a first gate, a first main electrode, and a second main electrode, the first gate being coupled to receive the control signal from the clock, the first main electrode being coupled to the voltage node;
   a second switching transistor having a second gate coupled to receive the control signal from the clock;
   a reference transistor having a third gate coupled to receive the control signal from the clock;
   wherein the control signal provided from the clock turns on the first switching transistor and the reference transistor and turns off the second switching transistor;
   wherein the first switching transistor is electrically coupled in series to the electrical device via the second main electrode when the first switching transistor is turned on; and
   wherein the reference transistor determines a current going through the electrical device when the first switching transistor and the reference transistor are turned on.

2. The switch regulator of claim 1, wherein the first voltage node comprises a ground.

3. The switch regulator of claim 1, wherein the first voltage node comprises a fixed voltage power supply.

4. The switch regulator of claim 1, wherein the electronic device comprises an inductor.

5. The switch regulator of claim 1, further comprising a reference current source coupled to the reference transistor.

6. The switch regulator of claim 5, wherein the reference transistor uses the reference current source to generate a reference voltage level and wherein the reference voltage level is used to measure the current going through the electrical device.

7. The switch regulator of claim 6, further comprising a second voltage node having a second voltage level, wherein the second voltage node is coupled between the second main electrode of the first transistor and the electrical device.

8. The switch regulator of claim 5, further comprising a comparator having a positive input and a negative input, wherein the positive input is coupled between the second electrode of the first switching transistor and the electrical device and wherein the negative input is coupled between the reference transistor and the reference current source.

9. The switch regulator of claim 5, further comprising a comparator having a positive input and a negative input, wherein the negative input is coupled between the second electrode of the first switching transistor and the electrical device and wherein the positive input is coupled between the reference transistor and the reference current source.

10. The switch regulator of claim 5, wherein the reference current source generates a current level at the current level limitation of the electrical device divided by a predetermined number.

11. The switch regulator of claim 1, wherein the reference transistor is a predetermined number of times smaller than the switching transistor.

12. The switch regulator of claim 1, wherein the first switching transistor has a first resistance and the reference transistor has a second resistance and wherein the second resistance is greater than the first resistance.

13. The switch regulator of claim 1, wherein the first switching transistor and the reference transistor each comprises an NMOS transistor and wherein the second switching transistor comprises a PMOS transistor.

14. The switch regulator of claim 13, further comprising a reference current source and a second voltage node, the reference current source being coupled to the reference transistor, the second voltage node having a second voltage level, wherein the reference transistor uses the reference current source to generate a reference voltage level and wherein the second voltage node is coupled between the second main electrode of the first transistor and the electrical device.

15. The switch regulator of claim 14, wherein when the second voltage level is greater than the reference voltage level, such that the current going through the electrical device is greater than the current level limitation of the electrical device.

16. The switch regulator of claim 1, wherein the first switching transistor and the reference transistor each comprises a PMOS transistor and wherein the second switching transistor comprises an NMOS transistor.

17. The switch regulator of claim 16, further comprising a reference current source and a second voltage node, the reference current source being coupled to the reference transistor, the second voltage node having a second voltage level, wherein the reference transistor uses the reference current source to generate a reference voltage level and wherein the second voltage node is coupled between the second main electrode of the first transistor and the electrical device.

18. The switch regulator of claim 17, wherein when both (1) the second voltage level is less than the reference voltage level and (2) the fixed voltage level minus the reference voltage level is greater than the reference voltage level, such that the current going through the electrical device is greater than the current level limitation of the electrical device.

19. A switch regulator comprising:
a ground node having a ground voltage level;
an inductor having a current level limitation;
a clock for providing a control signal;
a first NMOS transistor having a first gate and a main electrode, the first gate being coupled to receive the control signal from the clock, the main electrode being coupled to the ground node;
a PMOS transistor having a second gate coupled to receive the control signal from the clock;
a second NMOS transistor having a third gate coupled to receive the control signal from the clock;
a reference current source for providing a reference current;

wherein, when the control signal turns on the first and second NMOS transistors, the first NMOS transistor is electrically coupled in series between the inductor and the ground node, and the second NMOS transistor is electrically coupled to receive the reference current from the reference current source.

20. The switch regulator of claim 19, wherein the first NMOS transistor is a predetermined number of times larger than the second NMOS transistor.

21. The switch regulator of claim 19, wherein a comparator comprises a positive input and a negative input, the positive input being coupled between the first NMOS transistor and the inductor and the negative input being coupled between the reference transistor and the reference current source.

22. A switch regulator comprising:
a fixed voltage power supply for providing a fixed voltage level;
an inductor having a current level limitation;
a clock for providing a control signal;
a first PMOS transistor having a first gate, a first main electrode, and a second main electrode, the first gate being coupled to receive the control signal from the clock, the first main electrode being coupled to receive the fixed voltage level from the fixed voltage power supply;
an NMOS transistor having a second gate coupled to receive the control signal from the clock;
a second PMOS transistor having a third gate coupled to receive the control signal from the clock;
a reference current source for providing a reference current;
a comparator having a positive input and a negative input, the negative input being coupled between the second electrode of the first PMOS transistor and the inductor and the positive input being coupled between the reference transistor and the reference current source;
wherein, when the control signal provided from the clock turns on the first and second PMOS transistors, the first PMOS transistor is electrically coupled in series to the inductor via the second main electrode, and the second PMOS transistor is electrically coupled in series to the reference current source.

23. The switch regulator of claim 22, wherein the reference current is at the current level limitation of the inductor divided by a predetermined number.

24. The switch regulator of claim 23, wherein the first PMOS transistor is the predetermined number of times larger than the second PMOS transistor.

* * * * *